US 7,155,606 B1

(12) United States Patent
Smith et al.

(10) Patent No.: US 7,155,606 B1
(45) Date of Patent: Dec. 26, 2006

(54) METHOD AND SYSTEM FOR ACCEPTING PREVERIFIED INFORMATION

(75) Inventors: Michael D. Smith, Kirkland, WA (US); Brian A. Lamacchia, Seattle, WA (US); Michael J. Toutonghi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/548,056

(22) Filed: Apr. 12, 2000

(51) Int. Cl.
*H04L 9/32* (2006.01)

(52) U.S. Cl. .................. 713/156; 726/22; 380/270
(58) Field of Classification Search ........ 713/150–282; 726/22; 380/270
See application file for complete search history.

(56) References Cited

U.S. PATENT DOCUMENTS

| | | | |
|---|---|---|---|
| 5,313,635 A | 5/1994 | Ishizuka et al. | |
| 5,649,099 A | 7/1997 | Theimer et al. | |
| 5,881,289 A | 3/1999 | Duggan et al. | |
| 5,937,192 A | 8/1999 | Martin | |
| 5,940,590 A * | 8/1999 | Lynne et al. ................. | 713/200 |
| 6,029,000 A | 2/2000 | Woolsey et al. | |
| 6,058,482 A | 5/2000 | Liu | |
| 6,167,253 A | 12/2000 | Farris et al. | |
| 6,223,291 B1 * | 4/2001 | Puhl et al. .................... | 726/28 |
| 6,295,645 B1 | 9/2001 | Brewer | |
| 6,324,685 B1 | 11/2001 | Balassanian | |
| 6,370,687 B1 | 4/2002 | Shimura | |
| 6,393,420 B1 * | 5/2002 | Peters ............................ | 707/9 |
| 6,477,648 B1 * | 11/2002 | Schell et al. ................. | 713/200 |
| 6,539,480 B1 * | 3/2003 | Drews .......................... | 713/191 |
| 6,560,774 B1 * | 5/2003 | Gordon et al. .............. | 717/146 |

FOREIGN PATENT DOCUMENTS

| | | |
|---|---|---|
| EP | 0 778 522 A2 | 6/1997 |
| EP | 0 930 567 A2 | 7/1999 |

OTHER PUBLICATIONS

Piezbert, M. et al., "Does 'Just in Time' Better Late than Never!" *Popl 97*, Paris, France, pp. 120-131 (1997).
Sirer, E. et al., "Design and Implementation of a Distributed Virtual Machine for Networked Computers," *SOSP-17*, pp. 202-216 (1999).
U.S. Pat. Appl. No. 09/547,539, filed Apr. 12, 2000.

* cited by examiner

*Primary Examiner*—Nasser Moazzami
*Assistant Examiner*—Ellen C Tran
(74) *Attorney, Agent, or Firm*—Merchant & Gould P.C.

(57) ABSTRACT

A method for ensuring the integrity of a receiving system in a distributed computing environment includes receiving information from a transmitting system. The method also includes testing whether the information is preverified information. If the information is not preverified, the method includes verifying the information or rejecting receipt of the information. If the information is preverified, the method includes testing if the information was received from a trusted transmitting system. If the information was received from a trusted transmitting system, the method includes accepting receipt of the information without reverifying. If the information was not received from a trusted transmitting system, the method includes verifying the information or rejecting receipt of the information.

12 Claims, 4 Drawing Sheets

METHOD AND SYSTEM FOR ACCEPTING PREVERIFIED INFORMATION

TECHNICAL FIELD

The present invention relates to distributed computing environments and more particularly to sharing processes in distributed computing environments.

BACKGROUND OF THE INVENTION

Typically in a distributed computing environment, such as local area networks (LAN) and wide area networks (WAN), memory system integrity on a computing subsystem is a concern. A compromised memory system can be catastrophic to the entire distributed computing environment. The memory system can be compromised by, for example, an incoming data stream that represents an executable context, that contains errors.

In order to protect the integrity of the memory system on the computing subsystems, the subsystems typically include a verifier. The verifier is responsible for ensuring the integrity of the executable aspect of the data stream, prior to handing some degree of executing control over to the application contained with the incoming data streamon the computing subsystem. The verification by the verifier protects end users from malicious code. Malicious code may have been created by the source code author or be the result of a third party tampering with the code after it was distributed by the author. In general, the more design-time information there is associated with the code (ie. the closer the code is to the original source) the more verification there is that can be done to verify integrity. One option may be for the data stream to contain instructions in an intermediate language (IL) that is compiled from the source yet still needs further work prior to execution. In other words, the result of the compilation process is used by the code author to correct errors, whereas the result of the verification process is used by the end user to ensure system integrity.

Generally, the checks the verifier performs include a type system data flow analysis; that is, the verifier sees that every instruction in the IL system is type-consistent. Typically this check is performed by looking at the entire flow of control in the IL stream to make sure variable types, such as characters, integers, and real numbers, match. This process ensures that when a function is called by a subsystem, the variable types are correct and do not cause an error in the memory system. Typically, the verifier also looks at other properties, such as the metadata or executable file associated with the IL stream. This verifying process is memory and processor intensive. Therefore, improvements are desirable.

SUMMARY

In general, the approach described herein describes methods and systems for accepting preverified information from a transmitting computing system in a distributed computing environment.

In one aspect of the present invention, a method of ensuring the integrity of a receiving system in a distributed computing environment is provided. The method includes receiving information from a transmitting system. The method also includes testing whether the information is preverified information. If the information is not preverified, the method includes verifying the information or rejecting receipt of the information. If the information is preverified, the method includes testing if the information was received from a trusted transmitting system. If the information was received from a trusted transmitting system, the method includes accepting receipt of the information without reverifying. If the information was not received from a trusted transmitting system, the method includes verifying the information or rejecting receipt of the information.

In another aspect, a computer program storage medium readable by a computing system and encoding a computer program of instructions for executing a computer process for ensuring the integrity of a receiving system in a distributed computing environment is provided. The computer process is analogous to the method described above.

Another aspect of the present invention includes a system for ensuring the integrity of a receiving system in a distributed computing environment. The system includes a receipt module, a test module, a query module, a receipt module, and a verify module. The receipt module receives information from a transmitting system. The test module tests whether the information is preverified information. The query module tests if the information was received from a trusted transmitting system if the information if preverified. The accept module accepts receipt of the information without reverifying if the information was received from a trusted transmitting system. The verify module verifies the information or rejects receipt of the information if the information is not preverified or if the information is not from a trusted transmitting system even if preverified.

In another aspect, a computer data signal embodied in a carrier wave readable by a computing system and encoding a computer program of instructions for executing a computer process for ensuring the integrity of a receiving system in a distributed computing environment is provided. The computer process is analogous to the method described above.

A more complete appreciation of the present invention and its scope may be obtained from the accompanying drawings, that are briefly described below, from the following detailed descriptions of presently preferred embodiments of the invention and from the appended claims.

DETAILED DESCRIPTION

Figure 1:
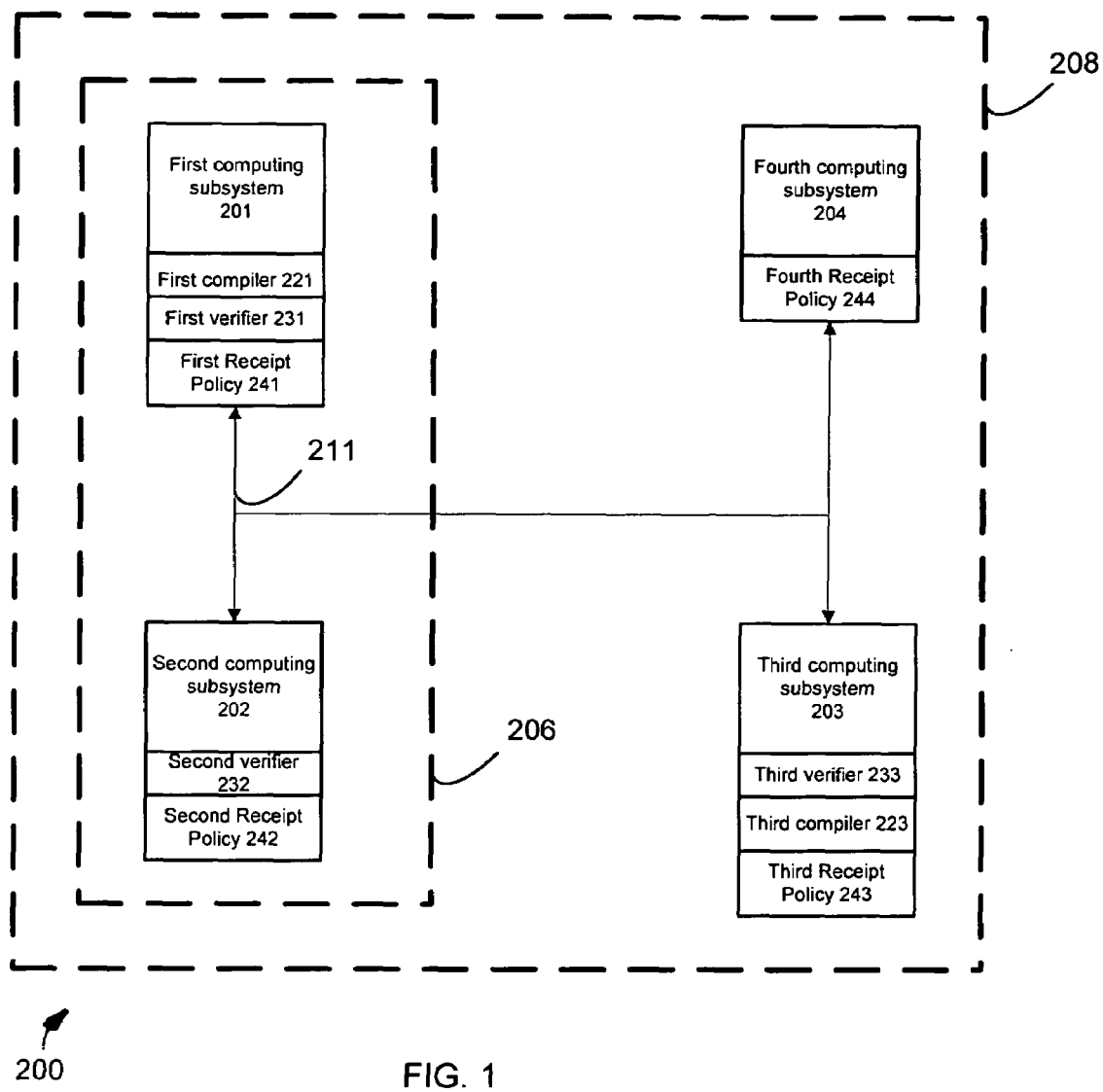
FIG. 1 is a schematic representation of a distributed computing environment that may be used to implement aspects of the present invention.

In the following description of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

Maintaining the integrity of a memory system of a computing subsystem in a distributed computing environment is important. Generally, the computing subsystem includes a verifier to verify incoming information for potentially fatal errors. This verifying process is memory and processor intensive. The present disclosure describes methods and systems for accepting preverified information from other systems.

Typically, computing systems execute a sequence of logical operations, commonly referred to as a computer program initially written in source language code. The source code could be any number of common computer programming languages, such as Fortran, C++, Pascal, and the like. Each language has its own advantages and disadvantages; therefore, the particular source code language is a matter of choice.

The computing system is able to execute the sequence of logical operations from machine-readable code compiled from source code. By the term "machine-readable," it is meant that the code is in a format with which the computing system can identify and execute the sequence of instructions. There are a large variety of machine-readable formats. The machine-readable format required by any particular computing system, in order to execute, is dependent on the particular computing system that will execute the code. Code that is executable on one particular computing system might not be executable on another computing system.

In computing systems having common executable environments, such as many current personal computing systems, a compiler can generate the source code into machine-readable code directly. However, in some heterogeneous executable environments, where each computing system requires its own particular machine-readable format, the source language codes are typically translated by a source-code compiler into an intermediate language (IL), typically implemented by and accepted by a large variety of systems. Thus, translating into IL code allows for code to be deployed to a variety systems in a single format.

In addition to translating the source code, the source-code compiler performs a number of integrity tests on the source code. For example, the source-code compiler performs a data flow analysis on the source code, checking for variable type mismatches. Every variable in the source code has a variable type associated with it. For example, the variable type could be a character string, an integer, or a real number. The compiler ensures that the result of a particular operation matches the expected result for that operation. For example, the sum of two integers should return a resulting integer. Therefore, the source-code compiler checks to ensure the resulting variable is of an integer type. This is important because variable mismatches are a common memory system error in computing systems. Type mismatches in the source code will lead the compiler to generate compiler time warnings or errors, allowing the source-code author to correct and then recompile.

In the particular embodiment illustrated in FIG. 1, a distributed computing environment 200 includes a first computing subsystem 201, a second computing subsystem 202, a third computing subsystem 203, and a fourth computing subsystem 204. Each computing subsystem 201–204 might be one of a variety of computing systems. Computing systems of this sort can include a server, a router, a network personal computer, a peer device, a hand-held device, a small device, and the like, or other common network nodes, each typically including many or all of the elements described herein in connection with the computing system 100 of FIG. 2, described hereinafter.

The distributed computing environment 200 might be one of a variety of distributed computing environments, for example, a local area network (LAN) 206 or a wide are network (WAN) 208. In such an environment the computing systems 201–204 are linked to each other using logical connections 211. Such computing environments are commonplace in offices, enterprise-wide computer networks, Intranets, and the Internet.

Intermediate language (IL) code is distributed to any number of receiving systems, for example the computing subsystems 201–204 of FIG. 1. Again, because each computing system requires its own particular machine-readable format, the IL code is translated by a machine-executable compiler. The machine-executable compiler translates the IL code into a format readable by the particular system desiring to execute the code. Alternatively, the IL code may be interpreted by another program running on a particular machine.

In this fashion, each source code programmer needs to only have the particular source-code compiler for the particular source code desired to be translated into the IL code, rather than many source-code compilers for each type of machine-executable code. Likewise, each computing subsystem, i.e., the computing subsystems 201–204 of FIG. 1, needs to only have a machine-executable compiler (or an IL interpreter) associated with the particular computing subsystem, rather than many machine-executable compilers or interpreters for each type of source code.

In FIG. 1, the first computing subsystem 201 includes a first compiler 221, capable of translating the IL code into the machine-executable code readable by the first computing subsystem 201. In this embodiment, the third computing subsystem 203 includes a third compiler 223, capable of translating the IL code into the machine-executable code readable by the third computing subsystem 203.

Memory integrity on a particular computing subsystem is a primary concern of host subsystems, particularly in a distributed computing environment. A compromised memory system can be catastrophic to the entire distributed system environment. The memory system can be compromised by, for example, an incoming data stream, such as an incoming IL code, with which the code violates the type system. Even though a source-code compiler checks the variable type system, the IL code could have been tampered with prior to receipt of the IL code by the subsystem. Therefore, in order to protect the integrity of the memory system on the receiving computing subsystem, the computing subsystem preferably includes a verifier.

The verifier ensures the integrity of an incoming data stream, such as the IL code, prior to compiling the IL code into machine-executable code for the computing subsystem. Generally, the verifier performs an analogous data flow analysis, to that of the source-code compiler, by looking at the entire flow of control in the IL code to ensure types match. By manipulating types, for example by mapping a real value to a void, or over-running a large buffer, malicious programmers can impact system integrity and cause arbitrary code to be executed to detrimental effect. The verifier protects the memory system by ensuring when a function is called by a subsystem, the variable types are correct and do not cause a fatal error. In other words, when the subsystem calls a function in the code, it is expecting to receive back resulting values having a certain variable type. The verifier ensures, prior to calling the function, that the variable types expected back by the subsystem are the variable types that the function will produce. The verifier looks at operations performed on the variable types and analyzes the operations to ensure the resulting variable type matches with source variable types. For example, the verifier knows that the sum of two integers will be an integer. Therefore, it checks to make sure the resulting variable is of an integer type.

Typically, the verifier examines other properties as well. For example, the metadata is examined to ensure it is well formed, and the executable image file associated with the IL code is examined to ensure it has not been tampered with. If an error is found by the verifier, the process is stopped and the IL code is rejected. In other words, the computing subsystem will not accept receipt of the IL code, thus ensuring its integrity.

In FIG. 1, the first computing subsystem 201 preferably includes a first verifier 231 to ensure the integrity of the computing subsystem 201. Likewise, the second and third computing subsystems 202, 203 include second and third verifiers 232, 233, respectively, to ensure the integrity of the second and third computing subsystems 202, 203.

In some instances, the source-code compiler generates an IL code that cannot be verified. Preferably, each computing subsystem includes a receipt policy for these instances. The receipt policy is a policy determined by the host computing subsystem about which unverified IL code it will accept, or as will be described in more detail below, which preverified code it will accept. For example, the host computing subsystem could reject all unverified IL code, accept unverified IL code but only if it is received from a trusted source, or accept all unverified IL code. By the term "trusted source," it is meant the host computing subsystem has knowledge that IL code received from the computing subsystem transmitting the IL code will not violate its memory integrity. This knowledge may be based on a trusted relationship between the computing subsystems. For example, the transmitting and receiving computing subsystems may be part of the same LAN within a particular company or the transmitting and receiving computing subsystems may be directly connected through a high-integrity connection, such as through a hard wire connection or an infra-red link. Therefore, the receiving computing subsystem knows that the IL code could not have been tampered with. An example policy might be that the receiving computing subsystem will accept unverified code from any member subsystem of its LAN but not outside of its LAN, i.e., the WAN.

In FIG. 1, the first computing system 201 includes a first receipt policy 241, regarding whether the first computing system 201 will accept incoming information. Likewise, the second, third, and fourth computing systems 202, 203, 204 include second, third, and fourth receipt policies 242, 243, 244, respectively, regarding whether the second, third, and fourth computing systems 202–204 will accept incoming information.

The verification process is processor and memory intensive, involving a large data flow analysis with multiple passes through the IL code. This process consumes valuable resources of the computing subsystem, especially for IL codes that are used numerous times. Small computing devices, such as a cellular phone, might not have the processor and memory capacity to verify code at all. Therefore, embodiments of the present invention implement methods and systems for accepting preverified information from other systems.

Figure 2:
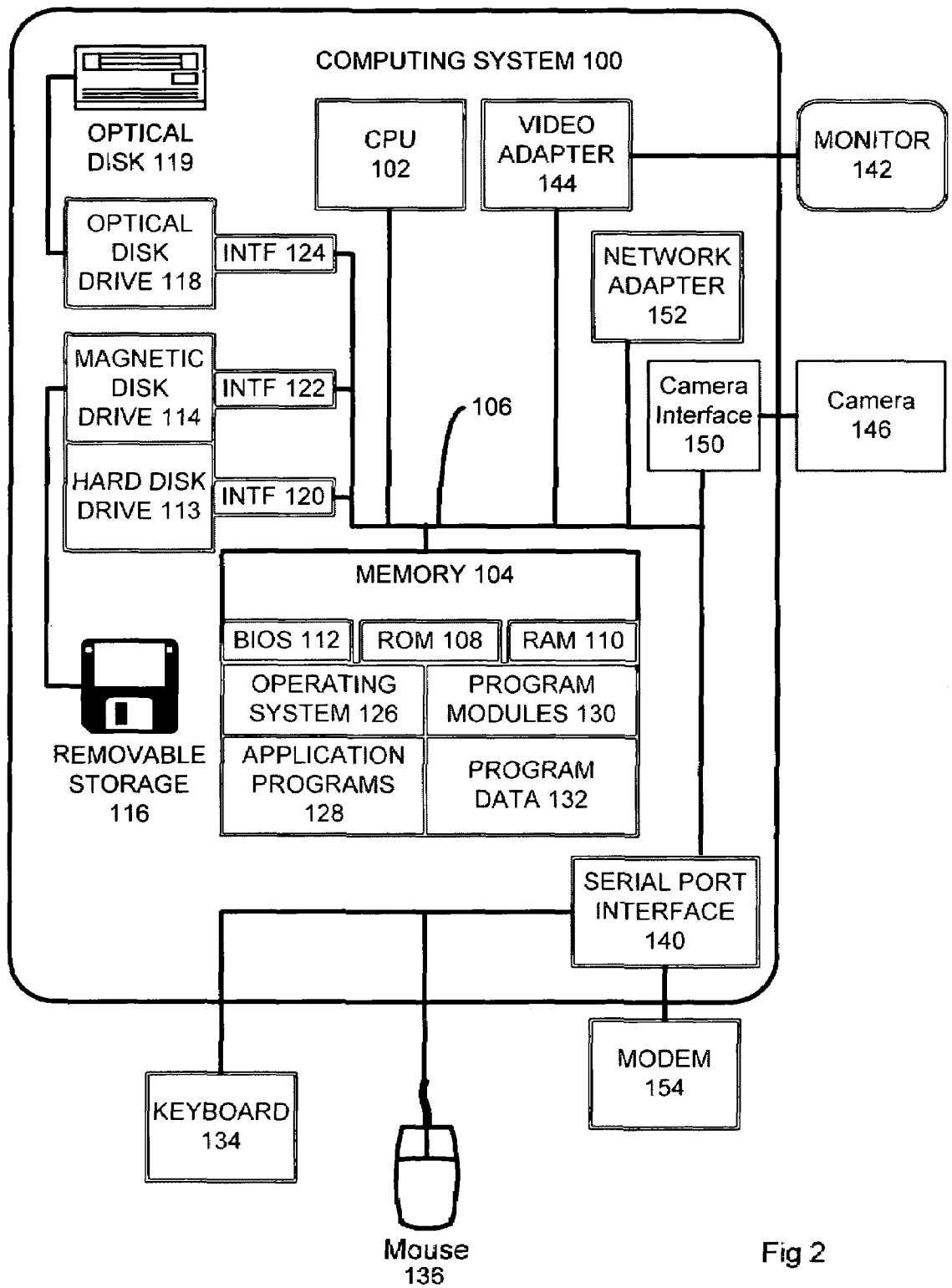
FIG. 2 is a schematic representation of a computing system that may be used to implement aspects of the present invention.

Referring now to FIG. 2, an exemplary environment used in implementing the invention includes a general purpose computing device in the form of a computing system 100, such as a personal computer, includes at least one processing unit 102. A variety of processing units are available from a variety of manufacturers, for example, Intel or Advanced Micro Devices. The computing system 100 also includes a system memory 104, and a system bus 106 that couples various system components including the system memory 104 to the processing unit 102. The system bus 106 might be any of several types of bus structures including a memory bus, or memory controller; a peripheral bus; and a local bus using any of a variety of bus architectures.

Preferably, the system memory 104 includes read only memory (ROM) 108 and random access memory (RAM) 110. A basic input/output system 112 (BIOS), containing the basic routines that help transfer information between elements within the computing system 100, such as during start-up, is typically stored in the ROM 108.

Preferably, the computing system 100 further includes a secondary storage device 113, such as a hard disk drive, for reading from and writing to a hard disk (not shown), a magnetic disk drive 114 for reading from or writing to a removable magnetic disk 116, and an optical disk drive 118 for reading from or writing to a removable optical disk 119, such as a compact disk (CD) ROM, digital video disk (DVD) ROM, or other optical media.

The hard disk drive 113, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, program modules and other data for the computing system 100.

Although the exemplary environment described herein employs a hard disk, a removable magnetic disk 116, and a removable optical disk 119, it should be appreciated by those skilled in the art that other types of computer-readable media, capable of storing data, can be used in the exemplary system. Examples of these other types of computer-readable mediums include magnetic cassettes, flash memory cards, digital video disks, Zip drives, CD ROMs, DVD ROMs, random access memories (RAMs), read only memories (ROMs), and the like.

A number of program modules may be stored on the hard disk, magnetic disk 116, removable optical disk 119, ROM 108, or RAM 110, including an operating system 126, one or more application programs 128, other program modules 130, and program data 132. A user may enter commands and information into the computing system 100 through input devices, such as a keyboard 134 and a pointing device 136, such as a mouse. Examples of other input devices might include a microphone, joystick, game pad, satellite dish, scanner, and a telephone. These and other input devices are often connected to the processing unit 102 through a serial port interface 140 that is coupled to the system bus 106. Nevertheless, these input devices also might be connected by other interfaces, such as a parallel port, game port, or a universal serial bus (USB). A display device 142, such as a monitor, is also connected to the system bus 106 via an interface, such as a video adapter 144. In addition to the display device 142, computing systems, in general, typically include other peripheral devices (not shown), such as speakers, printers, and palm devices.

The computing system 100 might also include a camera 146, such as a digital/electronic still or video camera, or film/photographic scanner, capable of capturing a sequence of images. The images are input into the computing system 100 via an appropriate camera interface 150. This camera interface 150 is connected to the system bus 106, thereby allowing the images to be routed to and stored in the RAM 110, or one of the other data storage devices associated with the computing system 100. However, it is noted that image data can be input into the computing system 100 from any of the aforementioned computer-readable media as well, without requiring the use of the camera 146.

When used in a LAN networking environment 206, FIG. 1, the computing system 100 of FIG. 2 is connected to the local network 206 through a network interface or adapter 152. When used in a WAN networking environment 208, such as the Internet, the computing system 100 typically includes a modem 154 or other means, such as a direct connection, for establishing communications over the wide area network 208. The modem 154, which can be internal or external, is connected to the system bus 106 via the serial port interface 140. In a networked environment, program modules depicted relative to the computing system 100, or portions thereof, may be stored in a remote memory storage device. It will be appreciated that the network connections shown are exemplary and other means of establishing a communications link between the computing systems may be used, such as, wireless links for phones, pagers, and other wireless devices.

Figure 3:
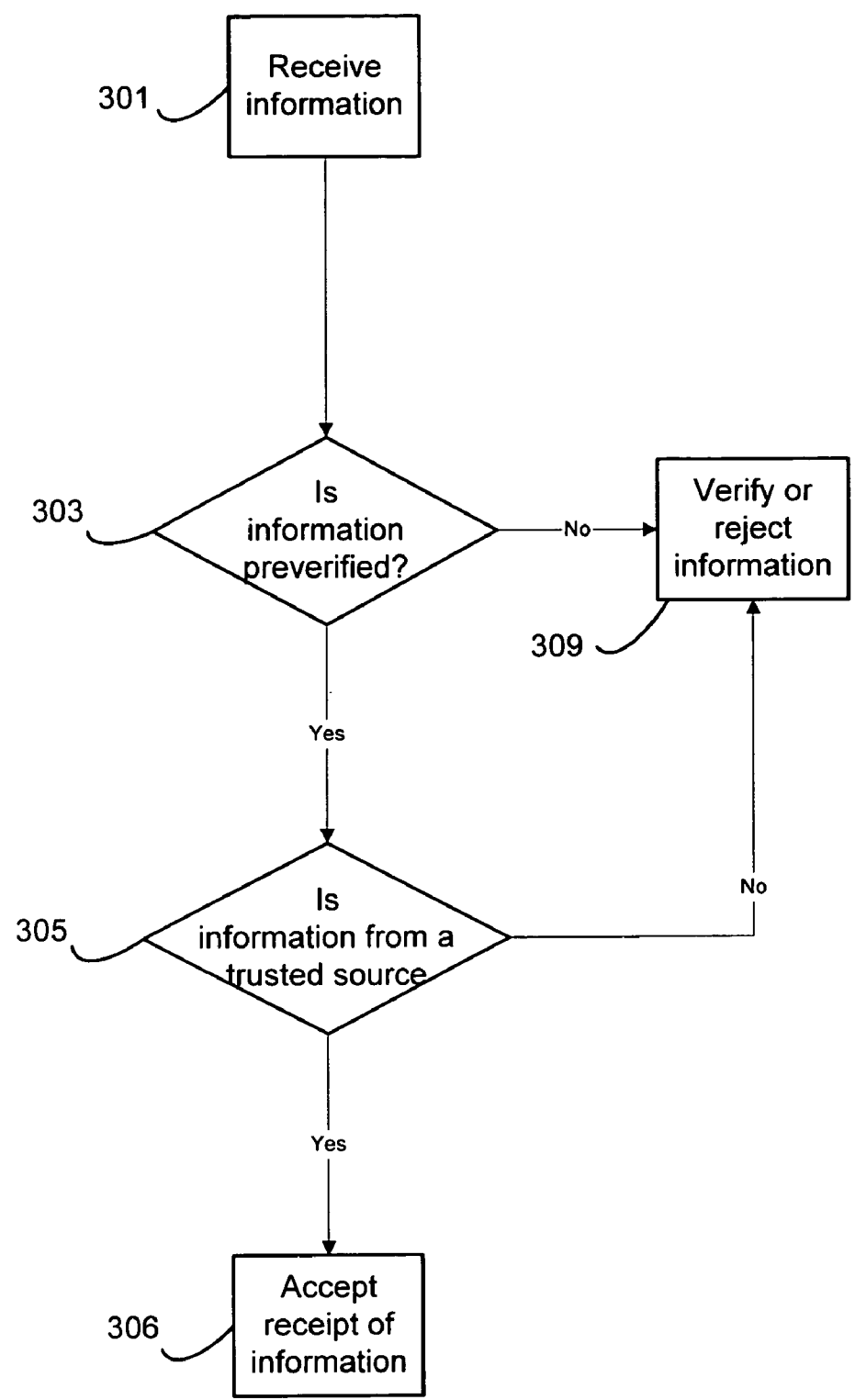
FIG. 3 is a schematic representation of methods and systems for accepting preverified information, according to an embodiment of the present invention.

Referring now to FIG. 3, an acceptance system for accepting preverified information from a transmitting computing system is shown. A receipt module 301 receives information from a transmitting system. It is noted that the terms "receiving" and "transmitting" include all types of exchanging information, such as wireless communication, hard-wired communication, and the transfer of storage medium from one system to another. A verify operation 303 tests whether the information claiming to have already been verified. If the verify operation 303 determines the information has been previously verified, a trust operation 305 detects if the information was verified by a trusted system. If the trust operation 305 determines the information was verified by a trusted system, an accept module 307 accepts the information.

Referring back to the verify operation 303, if the verify operation 303 determines that the information has not been previously verified, a verify module 309 verifies the information. Referring back to the trust operation 305, if the trust operation 305 determines that the verified information is not from a trusted source, the verify module 309 verifies the information.

Figure 4:
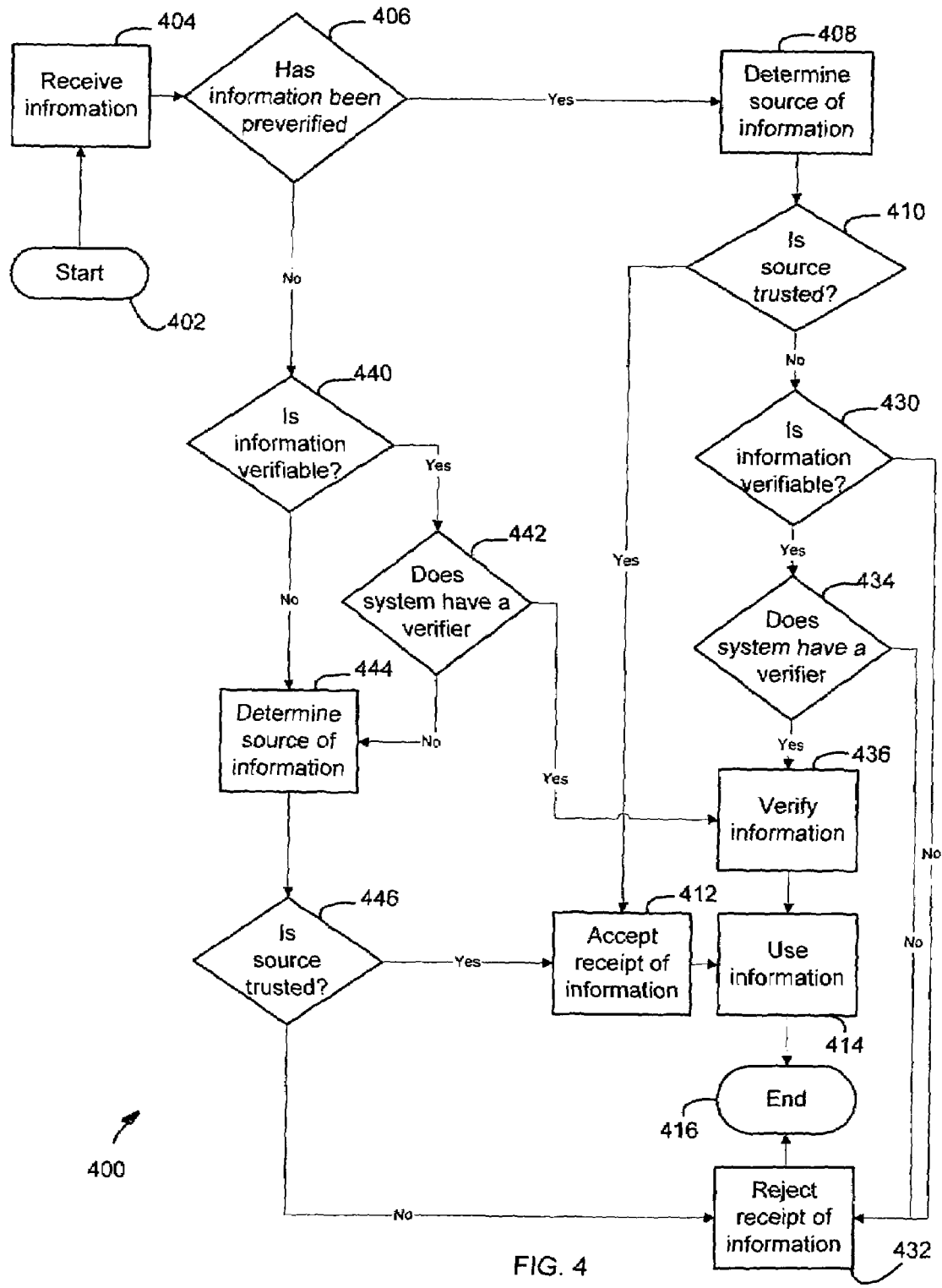
FIG. 4 is a flow chart illustrating the logical operations of the methods and systems of FIG. 3.

FIG. 4 is a flow chart representing logical operations of an acceptance system 400 for accepting preverified code from a trusted source, according to an example embodiment. Entrance to the operational flow of the acceptance system 400 begins at a flow connection 402. A receipt module 404 receives information from a transmitting system. A verify operation 406 determines if the information has been previously verified, or preverified. The verify operation 406 uses an indicator to determine if the information has been preverified. An example indicator includes a data stream, such as a digital signature, attached to the information. The data stream contains additional information including whether the information has been preverified. If the information has been preverified, the operational flow branches "YES" to an identify module 408.

The identify module 408 finds or identifies the source of the information. A query operation 410 detects if the source, identified by the identify module 408, is a trusted source. The identify module 408 uses an indicator to identify the source of the information. As described above, the indicator can include a data stream attached to the information. If the source is a trusted source, the operational flow branches "YES" to an accept module 412. The accept module 412 accepts the preverified information. A use module 414 uses the information, for example, executes a program code or stores the code for later transmission or use. The operational flow ends at 416.

Referring back to the trust operation 410, if the trust operation 410 detects the source is not a trusted source, the operational flow branches "NO" to the verifiable operation 430. The verifiable operation 430 detects if the information is verifiable. If the information is not verifiable, the operational flow branches "NO" to a reject module 432. The reject module 432 rejects receipt of the information and operational flow ends at 416.

Referring back to the verifiable operation 430, if the information is verifiable, the operational flow branches "YES" to a verifier query operation 434. The verifier query operation 434 detects whether the receiving system has a verifier. If the receiving system does not have a verifier, the operational flow branches "NO" to the reject module 432 and the operational flow proceeds as previously described. Referring back to the verifier query operation 434, if the verifier query operation 434 detects the receiving system does have a verifier, the operational flow branches "YES" to an information step 436. The information step 436 verifies the information. The operational flow proceeds to the use module 414 as previously described.

Referring back to the very operator 406, if the verify operator 406 determines that the information has not been previously verified, the operational flow branches "NO" to a second verifiable operation 440. The second verifiable operation 440 detects if the information is verifiable. If the information is not verifiable, the operational flow branches "NO" to a second identity module 444.

The second identity module 444 uses an indicator to identify the source of the information as previously described. A second query operation 446 detects if the source, identified by the second identity module 444, is a trusted source. If the source is not a trusted source, operational flow branches "NO" to the reject module 432. Operational flow proceeds as previously described. If the source is a trusted source, operational flow branches "YES" to the accept module 412. Operational flow proceeds as previously described.

Referring back to the second verifiable operation 440, if the information is verifiable, the operational flow branches "YES" to a second verifier query operation 442. The second verifier query operation 442 detects whether the receiving system has a verifier. If the receiving system does not have a verifier, the operational flow branches "NO" to the second identity module 444, and operational flow proceeds as previously described. If the receiving system does have a verifier, the operational flow branches "YES" to the information step 436 and operational flow proceeds as previously described.

The operational flow chart depicted in FIG. 4 may best be understood in terms of an application example. Referring to FIGS. 1 and 4, the receipt module 404 receives information, such as an IL code, in the first computing subsystem 201. The verify operation 406 determines that the information has been preverified. The identify module 408 determines that the information was received from the second computing subsystem 202. The query operation 410 detects that the second computing subsystem 202 is a trusted source. For example, the first computing system 201 might have a policy to accept verified code from any computing system within its LAN but not accept verified code from a computing system outside of its LAN. The accept module 412 accepts receipt of the preverified information from the second computing system 202. The use step 414 executes or interprets the information on the first computing system 201. The operational flow ends at 416.

In a second application example, the receipt module 404 receives information in the first computing system 201. The verify operation 406 determines that the information has been previously verified. The identify module 408 determines that the information was received from the third computing system 203. The query operation 410 determines that the third computing system 203 is not a trusted source, using the above described policy. The verifiable operation 430 determines that the information is verifiable. The verifier query operation 434 determines that the first computing subsystem has a first verifier 231. The information step 436 uses the first verifier 231 to verify the information. The use module 414 executes the information on the first computing system 201. The operational flow ends at 416.

In a third application example, the operational flow proceeds as above for the second application example from the receipt module 404 through the variable operation 430. The variable operation 430 determines that the information is not verifiable and the information is rejected by the reject module 432. The operational flow ends at 416.

In a fourth application example, the receipt module 404 receives information in the fourth computing subsystem 204. The verify operation 406 determines that the information has been previously verified. Operational flow proceeds from the identity module 408 to the verifier query operation 434 as described above. The verifier query operation 434 determines that the fourth computing subsystem does not have verifier. The reject module 432 rejects the receipt of the information and operational flow ends at 416.

In a fifth application example, the receipt module 404 receives information in the first computing subsystem 201. The verify operation 406 determines that the information is not preverified. The second verifiable operation 440 determines that the information is not verifiable. The second identify module 444 determines the source of the information. The second query operation 446 determines that the source is a trusted source. Operational flow proceeds to the accept module 412 as previously described. In a sixth application example, the operational flow proceeds as above for the fifth application example from the receipt module 404 through the second identity module 444. The second identity module 444 identifies the source as the third computing subsystem 203. In this example, the second query operation 446 determines the source is not a trusted source, using the above described policy, and the operational flow proceeds to the reject module 432 as previously described.

In a seventh application example, the operational flow proceeds as above for the fifth application example from the receipt module 404 through the second verifiable operation 440, except that the fourth computing subsystem 204 is the receiving computing system. The second verifiable operation 440 determines that the information is verifiable. The second verify query operation 442 determines that the fourth computing subsystem 204 does not have a verifier. Operational flow proceeds to the second identity module 444 as previously described.

In an eighth application example, operational flow proceeds as above for the seventh application example from the receipt module 404 through the second verify query operation 442, except that the third computing subsystem 203 is the receiving computing system. The second verify query operation 442 determines that the third computing subsystem 203 does have a verifier. Operational flow proceeds to the information step 436 as previously described.

The logical operations of the various embodiments illustrated herein are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method of ensuring the integrity of a first system in a distributed computing environment, the method comprising:
    sending information including intermediate language code from a second system to the first system;
    receiving the information from the second system;
    thereafter, testing whether the information sent from the second system is preverified information by examining a digital signature associated with the information indicating the information is preverified and what source verified the information;
    if the information is not preverified, verifying the information or rejecting receipt of the information, wherein verifying the information includes analyzing an entire flow of control in the intermediate code to ensure that resulting variable types match source variable types;
    if the information is preverified, testing if the information was received from a trusted system;
    if the information was received from the trusted system, accepting receipt of the information; and
    if the information was not received from a trusted system verifying the information or rejecting receipt of the information wherein verifying the information includes analyzing an entire flow of control in the intermediate code to ensure that resulting variable types match source variable types; and
    if receipt of the information is accepted:
        compiling the intermediate language code; and
        executing the complied intermediate language code.

2. A method according to claim 1 wherein the step of receiving includes receiving information from the second system via a hard-link or wireless communication channel or via a physical storage medium.

3. A method according to claim 1 wherein the step of accepting includes accepting receipt of the information without reverifying on a small device.

4. A method according to claim 3 wherein the step of accepting includes accepting receipt of the preverified information without reverifying on a cellular phone.

5. A computer program storage medium readable by a computing system and encoding a computer program of instructions for executing a computer process for ensuring the integrity of a first system in a distributed computing environment, the computer process comprising:
    sending intermediate language code from a first source;
    receiving the intermediate language code from the first source;
    thereafter, testing whether the intermediate language code sent firm the first source is preverified by examining a digital signature associated with the intermediate language code indicating the intermediate language code is preverified and what source verified the intermediate language code;
    if the intermediate language code is not preverified, verifying the intermediate language code or rejecting receipt of the intermediate language code, wherein verifying the information includes analyzing an entire flow of control in the intermediate language code to ensure that resulting variable types match source variable types;
    if the intermediate language code is preverified, testing if the intermediate language code was received from a trusted source;
    if the intermediate language code was received from the trusted source, accepting receipt of the preverified intermediate language code without reverifying; and
    if the intermediate language code was not received from the trusted source, verifying the intermediate language code or rejecting receipt of the intermediate language code, wherein verifying the information includes analyzing the entire flow of a control in the intermediate language code to ensure that the result, variable tunes match the source variable types; and
  if receipt of the information is accepted:
    compiling the intermediate language code; and
    executing the complied intermediate language code.

6. A computer process according to claim 5 wherein the step of receiving includes receiving intermediate language code from the first source via a hard-link or wireless communication channel or via a physical storage medium.

7. A computer process according to claim 5 wherein the step of accepting includes accepting receipt of the preverified intermediate language code without reverifying on a small device.

8. A computer process according to claim 7 wherein the step of accepting includes accepting receipt of the preverified intermediate language code without reverifying on a cellular phone.

9. A system for ensuring the integrity of a first system in a distributed computing environment, the apparatus comprising:
  a receipt module that receives information including intermediate language code sent from a second system;
  a test module that thereafter tests whether the information sent from the second system is preverified information by examining a digital signature associated with the information indicating the information is preverified and what source verified the information;
  a query module that tests if the information was received from a trusted system if the information if preverified;
  an accept module that accepts receipt of the information without reverifying if the information was received from the trusted system;
  a verify module that verifies the information by analyzing an entire flow of control in the intermediate language code to ensure that resulting variable types match source variable types, or rejects receipt of the information if the information is not preverified or if the information is not from the trusted system even if preverified; and
  a user module that complies and executes the intermediate language code if receipt of the information is accepted.

10. A system according to claim 9 wherein the receipt module receives information from the second system via a hard link or wireless communication channel or via a physical storage medium.

11. A system according to claim 9 wherein the system is a small device.

12. A system according to claim 11 wherein the small device is a cellular phone.

* * * * *